June 12, 1923.

W. A. SPRINGOWSKI

SELF WINDING HOSE REEL

Filed Oct. 21, 1922

W. A. Springowski
INVENTOR

BY Victor J. Evans
ATTORNEY

WITNESS:

June 12, 1923.
W. A. SPRINGOWSKI
1,458,861
SELF WINDING HOSE REEL
Filed Oct. 21, 1922
4 Sheets-Sheet 2
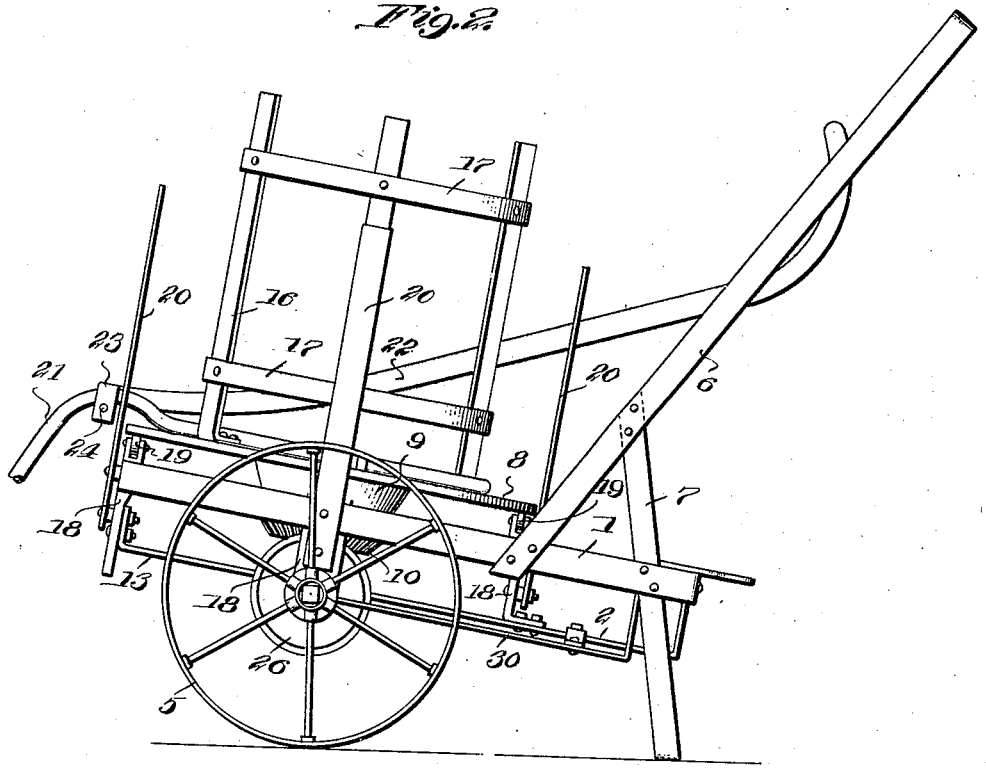

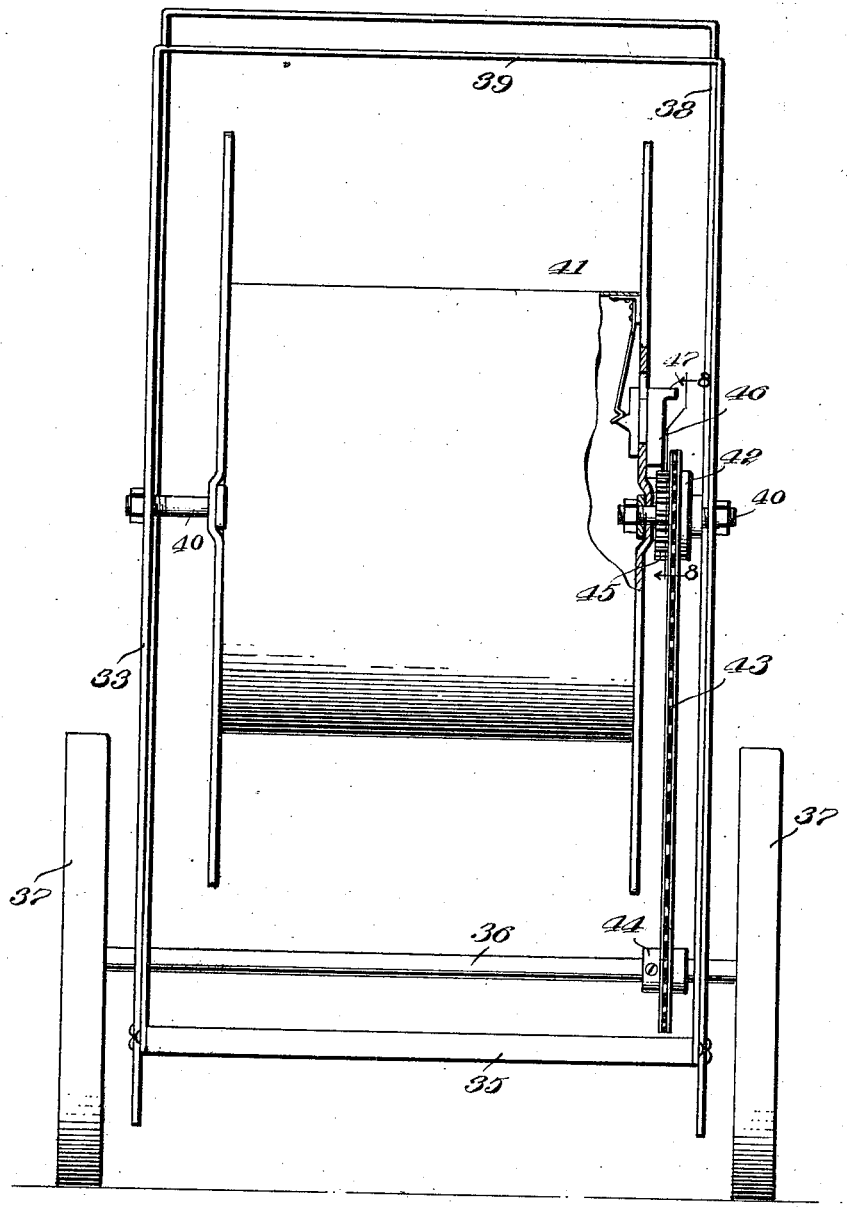

June 12, 1923.
W. A. SPRINGOWSKI
1,458,861
SELF WINDING HOSE REEL
Filed Oct. 21, 1922    4 Sheets-Sheet 4
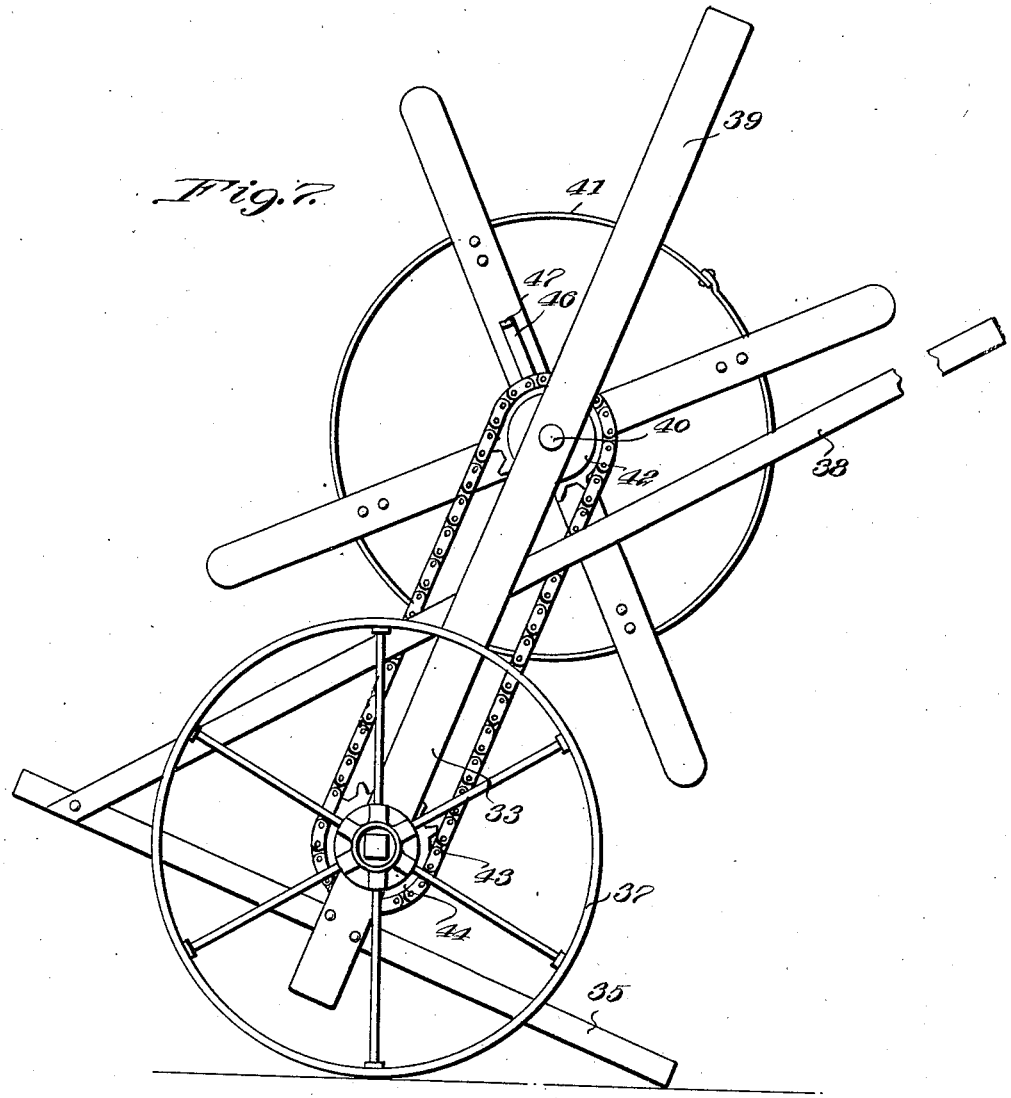
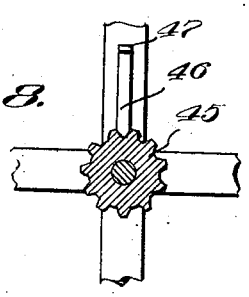
W. A. Springowski
INVENTOR
BY Victor J. Evans
ATTORNEY
WITNESS:

Patented June 12, 1923.

1,458,861

UNITED STATES PATENT OFFICE.

WILLIAM A. SPRINGOWSKI, OF LORAIN, OHIO.

SELF-WINDING HOSE REEL.

Application filed October 21, 1922. Serial No. 596,088.

*To all whom it may concern:*

Be it known that I, WILLIAM A. SPRINGOWSKI, naturalized citizen of U. S. of America, residing at Lorain, in the county of Lorain and State of Ohio, have invented new and useful Improvements in Self-Winding Hose Reels, of which the following is a specification.

An object of this invention is to produce a wheeled mount for hose reels, whereby the wheeling of the mount will revolve the reel to wind a hose thereon or unwind a hose therefrom.

A further object is to produce a device of this character whereby the hose will be automatically wound on a reel, and properly coiled in such winding.

To the attainment of the foregoing, and other objects which will present themselves as the nature of the invention is better understood, reference is to be had to the drawings which accompany and which form part of this application.

In the drawings:—

Figure 2 is a side elevation thereof.

Figures 4 and 5 illustrate details.

Figure 6 is a front elevation of a modification.

Figure 7 is a side elevation thereof.

Figure 8 is a sectional view on the line 8—8 of Figure 6.

Figures 1, 3:
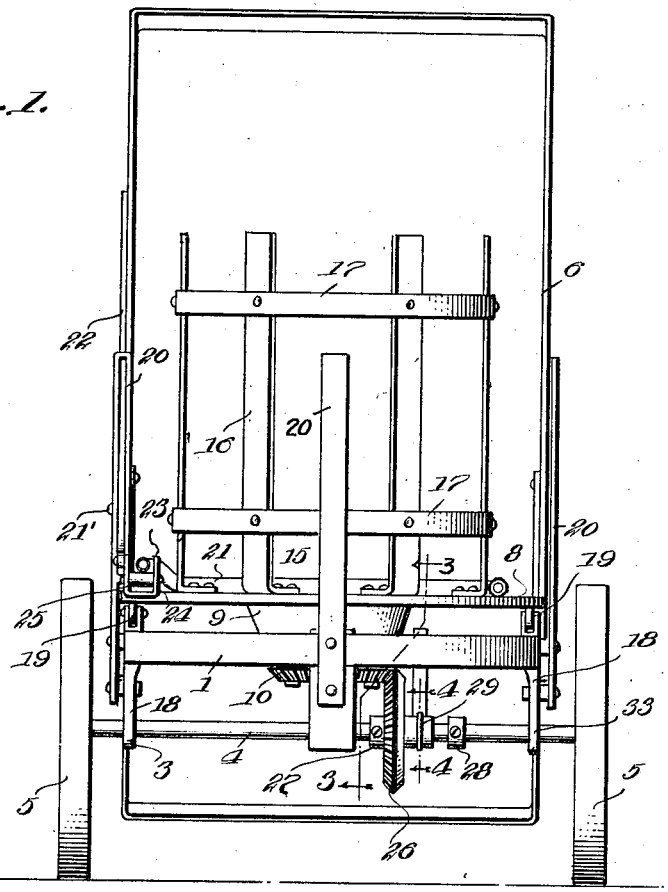
Figure 1 is a front elevation of one form of the improvement.
Figure 3 is a sectional view approximately on the broken line 3—3 on Figure 1.

Referring now to the drawings in detail, and Figures 1 to 5 in particular, the numeral 1 designates a substantially rectangular frame whose outer end, however, is preferably rounded. The frame is preferably constructed of metal, and also preferably includes upper and lower members. The lower members are indicated for distinction by the numeral 2, and are provided with bearings 3 for a shaft 4, on the ends of which the ground wheels 5 are secured. Secured to the rear of the frame, at the sides thereof are upwardly extending handles 6, and connected to the handles and also to the frame there are angle brace bars 7 that also provide rests for the frame when the same is stationary.

Above the upper member of the frame there is a table 8 which is round in plan and which is centrally provided with a depending boss or lug 9 on whose outer face there is secured a beveled gear 10. The gear is centrally formed with a depending hub 11 that receives therein a pin 12 upstanding from a substantially U-shaped bracket 13 that is secured to the frame. The pin is surrounded by an anti-frictional roller 14 which is in slight contacting engagement with the rounded bore of the hub 11.

On the table 8 there are secured angle brackets 15 to which are connected vertically disposed bars 16, the said bars being surrounded and being connected to spaced rings 17. The bars 16 provide the hose reel proper.

Connected to the upper and lower bars of the frame are vertically disposed plates or bars 18 which preferably have their upper ends thickened and bifurcated, and in the bifurcations there are pivotally supported rollers 19 which are in contacting engagement with the under face of the table 8.

Certain of the bars or plates 18 have the rollers 19 journaled inward of their upper ends, so that the said bars may be projected over the sides and over the front of the table, but, if desired, other bars 20 may be so arranged. These projecting bars, indicated by the numeral 20 serve as contact elements for a hose 21, when the latter is wound on the reel.

Pivotally secured to one of the side bars 20, as at 21', there is a lever 22, the same being directed both toward the handle 6 and toward the front of the device. On the forward end of the lever there is a yoke 23, and supporting a shaft 24 and on this shaft there is journaled a roller 25. The hose is designed to travel over the roller 25 either when wound upon or unwound from the reel, and by manipulating the lever, the hose can be properly coiled around the vertically disposed reel.

On the shaft 4 there is a beveled gear 26. The gear is slidable on the shaft, being limited in its movement toward the gear 10 by a collar 27 fixed on the shaft, and being limited in its movement in an opposite direction by a similar collar 28. Between the collars 27 and 28 the shaft is provided with a spline that is received in a spline-way in the bore of the gear 26 and the hub therefor. The hub is provided with an annular groove that receives therein a ring 29 secured on one end of a lever 30, the said lever being pivoted to the rear of the frame and having a depending lip or detent 31 to be received in one of two notches 32 on one of the frame bars. When the lever is swung to arrange the detent in one of the notches, the gear 26 will be in mesh with the gear 10, so that wheeling of the device will revolve the reel. Of course, the hose may be wound on or unwound from the reel in accordance with the direction of travel of the wheeled support or frame. Also, of course, when the lever is moved to bring the detent into the second notch, the gear 26 will be brought out of mesh with the gear 10 so that the device may be wheeled without imparting motion to the reel or influencing the hose thereon.

In the remaining figures of the drawings, the frame 33 may be substantially similar to that just described, the same having journals for a shaft 36 on the ends of which there are keyed ground wheels 37. The frame 35 has secured thereto upwardly extending rearwardly inclined handles 38 and has also secured thereto a substantially U-shaped yoke 39. Between the arms of the yoke 39 there are journaled stub shafts 40 on which are secured a horizontally disposed reel 41. On one of the stub shafts 40. to one side of the reel there is a sprocket wheel 42 around which is trained a sprocket chain 43 which is also trained around a sprocket wheel 44 keyed or otherwise secured on the shaft 36. The sprocket wheel 42 is loose on the shaft 40 but has one of its ends provided with a clutch surface 45 designed to be engaged by a slidable clutch member 46 having its bore provided with a keyway for a key on the said stub shaft 40. The operating lever for the slidable clutch element 46 is indicated by the numeral 47, and the same may engage suitable means for holding the clutch element 46 into or out of clutching engagement with the sprocket wheel 42.

It is thought that the foregoing description, when taken in connection with the drawings will fully set forth the construction, operation and advantages of the improvement, but it is deemed necesary to add that the nature of the invention is such as to render the same susceptible to changes in size, proportion and details of construction, and therefore the improvement is to be limited only to the scope of the appended claims.

Having described the invention, I claim:—

1. In a device for the purpose set forth, a wheeled frame, a table thereabove, antifrictional bearings therefor, spaced rods secured on the table, rings surrounding and connecting the rods, and said rods and rings providing a hose reel, guard rods to the sides and to the front of the reel supported from the frame, means for revolving the table when the frame is wheeled, means for rendering the said mentioned means inoperative, and means for directing a hose on to or from the reel to coil or uncoil said hose.

2. In a device for the purpose set forth, a wheeled frame, a table thereabove, antifrictional bearings carried by the frame, for the table, a reel secured on the table, guard rods in the reel supported from the front and sides of the frame, a lever pivotally secured to one of the side guard rods, a yoke on the outer end thereof, a roller journaled in the yoke designed to receive thereover a hose to be wound on or unwound from the reel, means for revolving the table when the frame is wheeled, and means for rendering said mentioned means inoperative.

3. In a device for the purpose set forth, a wheeled frame, members projecting therefrom having anti-frictional rollers journaled in the upper ends thereof, a table resting on the rollers, a gear having a hub secured on the under face of the table, a roller supported from the frame and received in the bore of the hub, a reel secured on the table, guard bars for the reel supported at the front and the sides of the table, a lever pivotally secured to one of said side bars, anti-frictional means on the end thereof for receiving a hose to be wound on or unwound from the reel, a gear slidable in a keyway on the shaft for the wheeled frame, means limiting the sliding of the gear in two directions, lever operated means for moving the gear in mesh with the first mentioned gear or out of engagement therewith, and means for latching the lever when moved to either of such positions.

In testimony whereof I affix my signature.

WILLIAM A. SPRINGOWSKI.